J. Krauser.
Cider Mill.
No. 1,793. Reissued Oct. 11, 1864.
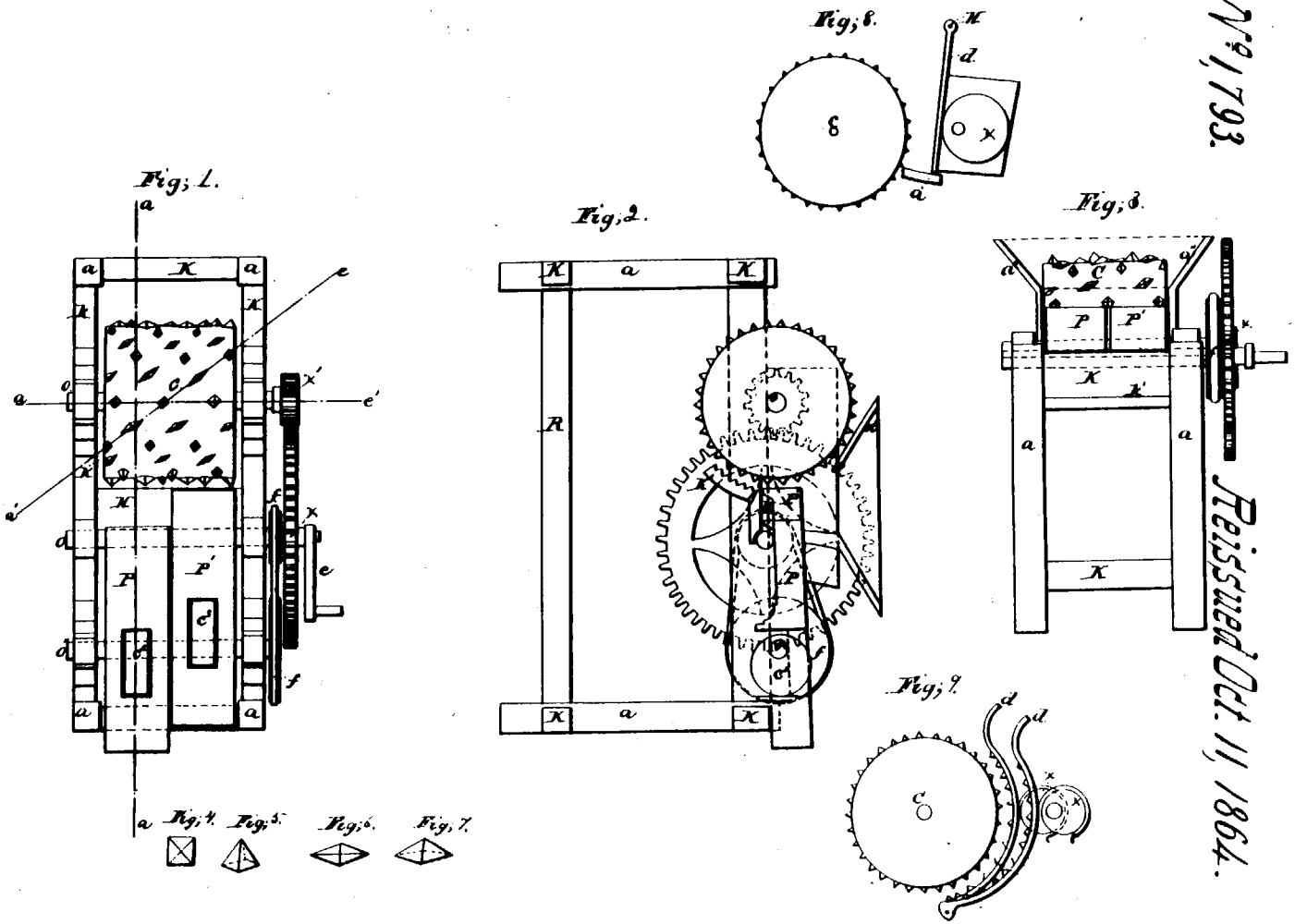

BEST AVAILABLE COPY

BEST AVAILABLE COPY

UNITED STATES PATENT OFFICE.

H. K. PARSONS, OF HARRISBURG, ASSIGNEE, BY MESNE ASSIGNMENTS, OF JOHN KRAUSER, OF READING, PENNSYLVANIA.

IMPROVEMENT IN CIDER-MILLS.

Specification forming part of Letters Patent No. 9,972, dated August 30, 1853; Reissue No. 1,793, dated October 11, 1864.

*To all whom it may concern:*

Be it known that JOHN KRAUSER, of Reading, in the county of Berks and State of Pennsylvania, did invent a new and useful Improvement in Cider-Mills; and I do hereby declare that the following is a full, clear, and exact description thereof, reference being had to the accompanying drawings, making part of this specification, in which—

Figure 1 is a plan or top view of the machine with its hopper and side casing removed, so as to exhibit the working parts of the machine to a better advantage. Fig. 2 is a vertical longitudinal section taken in the line *a a* of Fig. 3. Fig. 3 is a rear elevation with a portion of the hopper removed, so as to expose to view the cylinder.

Similar letters indicate the same parts wherever they occur on the drawings.

C represents the grinding-cylinder, armed with two kinds of teeth, one variety being shown in plan by Fig. 4 and in perspective by Fig. 5, the other kind being shown in a similar manner by Figs. 6 and 7. These teeth are arranged in a spiral form upon the exterior of the cylinder, and are so combined that in the direction from *a'* to *c*, Fig. 1, they alternate each other; but in the direction from *c'* to *d* they form rows of a similar kind.

Cylinder C is mounted upon a shaft, *o*, and receives its motion from the crank-shaft *o'* by means of the gear-wheels *x x'*, as shown in Figs. 1 and 2. The band-wheels *f f* are secured upon their shafts and communicate with each other by means of a belt. Upon the shaft *o''* are keyed two eccentrics, $c^2$ and $c^3$, which revolve within vertical slots cut in the pistons or plungers P and P', to which they communicate an alternating reciprocating movement when the machine is in operation. The front ends of these pistons slide upon the upper surface of the bed-piece H, and their rear ends upon cross-piece K, Fig. 3, by which arrangement they receive their proper direction when in motion.

Upon shaft *o'* is keyed a crank, E, by which motion is communicated to the machine. Another crank may be attached to the opposite end of said shaft, if desired; or, if it be desired to operate the machine by other than hand-power, a pulley may be substituted for the crank.

In Figs. 2 and 3, *a'' a''* indicate the sides of the hopper for containing the material to be ground or crushed. This hopper, it will be observed, is not placed over the top of the cylinder, but rather to one side of it, so as to convey the fruit directly upon the top of the front ends of the pistons P and bed-piece H. By this arrangement of parts it will be perceived that as one of the pistons is drawn back by the eccentric a cell or space is formed between the end of the piston and the cylinder, into which the apples fall from the hopper. By having the apples thus delivered upon the end of the piston they are more or less kept in motion by the movement of the piston, and thus prevented from becoming choked in the throat of the hopper. The apples in the space between the end of the piston and the cylinder are prevented from being shoved upward away from contact with the cylinder by the pressure of the superincumbent mass above them, and thus held firmly in place while being pressed by the end of the piston up against the surface of the cylinder. By this arrangement the apples are both crushed and ground at one and the same operation, the crushing being performed by the forward movement of the pistons, and the grinding by the revolving cylinder.

In Fig. 8 a modification of the machine is shown. In this case the crushing devices, instead of being arranged to slide or move in a direct line, as in Figs. 1 and 2, are pivoted, as at H', in such a way as to produce an oscillating or swinging motion. In this case the eccentrics are placed in the rear of the crusher, and are connected therewith by means of a suitable yoke.

Fig. 9 represents still another modification, differing from the preceding in the form or shape of the crushers, and in being pivoted at the bottom instead of the top, the eccentrics being placed in their rear and connected by proper yokes in any suitable manner.

In all cases a concave, *k'*, is affixed underneath the bed-piece H. This concave, *k'*, i armed on its inner surface with angular ribs or projections arranged parallel with the shaft *o*, and the whole is mounted upon any frame of suitable size and shape.

The operation of the machine is so apparent that any further or detailed statement thereof is deemed unnecessary.

Having thus described said invention, what I claim as new therein, and desire to secure by Letters Patent, is—

1. So locating the hopper as that the substance to be ground shall be delivered upon that portion of the piston or crusher which shall be within the hopper when thrust forward, or into the space formed by the withdrawal of the same when thrown backward.

2. Operating the pistons or concaves of a cider-mill by means of eccentrics, whether said pistons be arranged, as in Figs. 1 and 2, to move in a straight line, or be pivoted at top or bottom, as in Figs. 8 and 9.

3. The concave *k'*, arranged to operate in combination with the pistons P or with the concaves *d*, as and for the purposes set forth.

H. K. PARSONS.

Witnesses:

LE ROY PARSONS,
KIRK HAINES.